(No Model.)

G. REZNOR.
PLUMBER'S HOOK.

No. 501,439.

Patented July 11, 1893.

Witnesses
Edwin L. Yewell
Chas. A. Muzzy

Inventor
George Reznor
By Alexander & Davis
Attorneys

UNITED STATES PATENT OFFICE.

GEORGE REZNOR, OF MERCER, PENNSYLVANIA.

PLUMBER'S HOOK.

SPECIFICATION forming part of Letters Patent No. 501,439, dated July 11, 1893.

Application filed April 12, 1893. Serial No. 470,012. (No model.)

*To all whom it may concern:*

Be it known that I, GEORGE REZNOR, a citizen of the United States, residing at Mercer, in the county of Mercer and State of Pennsylvania, have invented certain new and useful Improvements in Plumbers' Hooks for Fastening Water and Gas Pipes, of which the following is a specification, reference being had therein to the accompanying drawings, in which—

Figure 1:
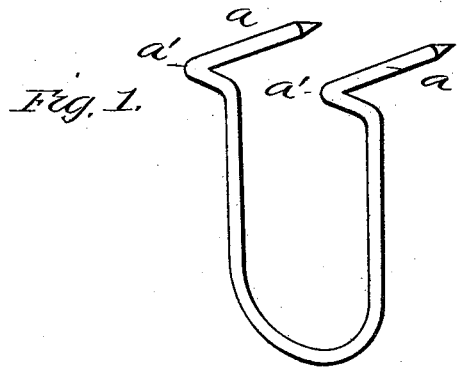
Figure 2:
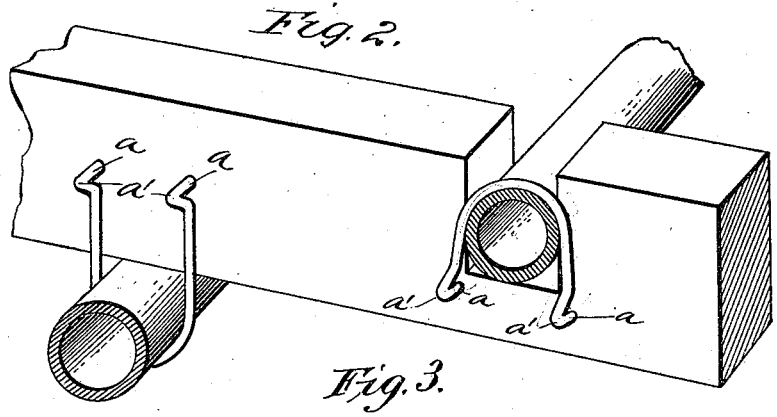

Figure 1 is a detail perspective view of the improved form of hook; Fig. 2 a perspective view showing its use in securing pipes to the floor joists of a building, and Fig. 3 a side view of a slightly different form of hook.

This invention relates to that class of hooks known as "plumbers' hooks," which are used to fasten and support water and gas piping in various positions in a building. These hooks have heretofore been made of forged metal and it is the object of this invention to provide a hook which can be readily constructed of iron or steel wire and which will be therefore stronger and neater and materially more inexpensive to manufacture, as more fully hereinafter set forth.

As shown, the preferred form of this hook is constructed of a single piece of strong wire, bent about midway its ends into substantially a U-form, the ends of the two arms thus formed being bent laterally substantially at right angles, and sharpened to form two entering-prongs $a\ a$. The U-shaped part may of course be made any length desired, so that the pipes may be held close up under the joists or suspended some distance therefrom, as may be desired. At the bend in each of the prongs an angular bend $a'$ is formed which projects out laterally in the opposite direction from the prong; these projections form rigid impact-shoulders, against which to hammer in driving the prongs into the wood, thereby avoiding the bending of the prongs and enabling them to be quickly and easily driven home. It will be observed that the piping rests in the U-part and the arms of the hook bear against the side of the joists when the prongs are driven home, thereby firmly supporting the piping.

Figure 3:
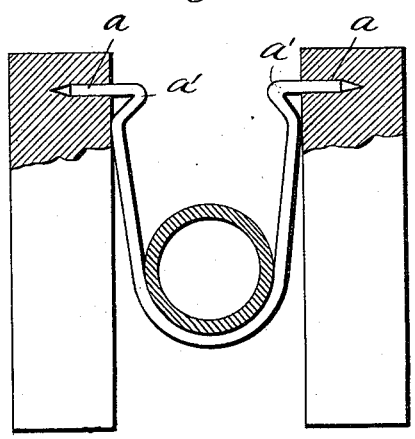

Instead of securing the pipe to the lower edges of the joists the hooks may be employed in various other positions. For instance, they may be used to secure the piping down in notches in the joists as shown at the right end of Fig. 2. As shown in Fig. 3, the hook may have its prongs bent out at right angles to those shown in the other views, in order to adapt the devices for use in other positions.

This hook can be manufactured very easily and cheaply and it will be very strong and durable and easily driven into place.

Having thus fully described my invention, what I claim is—

The plumber's-hook for fastening piping, consisting of a single piece of wire bent into substantially a U-form and having the ends of its arms sharpened and bent laterally, oppositely projecting shoulders being formed at the bends in the arms, substantially as described.

In testimony whereof I affix my signature in presence of two witnesses.

GEORGE REZNOR.

Witnesses:
W. J. LYONS,
J. C. MILLER.